March 27, 1951 — E. L. PRIZER — 2,546,317
APPARATUS FOR SUPPLYING SOLUBLE TREATING AGENTS TO FLOWING WATER
Filed Dec. 20, 1947 — 2 Sheets-Sheet 1

INVENTOR.
Eugene L. Prizer
BY
ATTORNEY

March 27, 1951 E. L. PRIZER 2,546,317
APPARATUS FOR SUPPLYING SOLUBLE TREATING
AGENTS TO FLOWING WATER
Filed Dec. 20, 1947 2 Sheets-Sheet 2

INVENTOR.
Eugene L. Prizer
BY
Alfred W. Knight
ATTORNEY

Patented Mar. 27, 1951

2,546,317

UNITED STATES PATENT OFFICE 2,546,317

APPARATUS FOR SUPPLYING SOLUBLE TREATING AGENTS TO FLOWING WATER

Eugene L. Prizer, San Diego, Calif., assignor of one-fourth to Murray Ferguson, Compton, Calif., and one-fourth to John A. Prizer, Fullerton, Calif.

Application December 20, 1947, Serial No. 793,036

14 Claims. (Cl. 47—1)

This invention relates to the supplying of treating agents to flowing water and more particularly relates to an apparatus for dissolving a soluble solid treating agent in a flowing stream of water and for releasing the resultant solution to the stream in controlled quantities and at controlled concentrations.

The invention is adapted particularly for use in connection with irrigation ditches and similar open channels, either artificial or natural, wherein an open surface stream is flowing, for the purpose of supplying fertilizing or soil-correcting agents to the water, to be delivered thereby to the soil in the course of irrigation, but is also adapted, and may be used in other situations where it is desired to continuously treat water flowing in an open surface stream with a relatively large quantity of soluble solid treating agent.

One of the principal objects of the invention is to provide for the continuous and relatively uniform supply of soluble treating agents, preferably in relatively finely divided form, to a solution-forming area wherein they may be quickly dissolved. As is well known, the greater surface area of a relatively finely divided mass of solute makes the mass more susceptible to quick dissolution than a mass of more bulky particles. It is, however, common experience both in the laboratory and in the field, that masses of finely divided soluble solids tend to cake at the immersion line when only partly immersed, and that thereafter they feed with difficulty to the solution-forming area. The present invention contemplates preferably the use of masses of finely divided solute in the interest of a high rate of solution, and the feeding of such masses by gravity in the interest of economy of labor and power, and is conceived with the purpose of preventing caking of the mass, rapidly breaking up any cake which may be formed, and thereby facilitating the gravity flow of the solute as replacement for the solution.

A more detailed object of the invention is to provide simple and continuously acting means for the arresting of capillary action in the mass of treating agent, and the repetitive flushing with fresh water and draining of the solution from that part of the mass adjacent to the capillary line, it having been found that such arresting and drainage is quite effective in preventing the aforesaid caking action and that the repetitive flushing and drainage is highly efficient in promoting dissolution of the mass of treating agent, in the manner that surging waves more rapidly erode a shore than does still water or even a flowing stream.

A further object of the invention is to provide a method and apparatus for use as above-described wherein the solution-forming activity of a water stream upon a mass of soluble solid treating agents is accentuated and expedited so as to cause the rapid dissolution of that part of the mass exposed to the water, with the result that only a small part of the mass need be so exposed in order to produce a solution of high concentration.

Another object of the invention is to provide a method and apparatus for use as above-described wherein a surging undulant action of the water stream is used to repetitively immerse and drain a small portion of the mass of treating agent so as to effect rapid dissolution thereof, and is combined with a continuous discharge to the water stream of the solution so formed without requiring intervention of surge chambers or storage chambers.

Yet another object of the invention is to provide a method and apparatus for use as above-described wherein the rate of solution of a treating agent in an open stream of water may be readily controlled within rather wide limits, whereby the invention may be adapted for use under widely varying conditions of water flow rate, desired concentration of the solution of treating agent, and solubility of the particular treating agent in use.

A further important object of the invention is to provide a method and apparatus for use as above-described wherein a relatively large total quantity of treating agent may be continuously and relatively uniformly supplied to flowing water with substantially complete solution of the agent in the water and with a low requirement of attendant labor and supervision.

A particular object of the invention is to provide a method and apparatus for use as above-described, wherein a considerable total quantity of treating agent may be disposed in position for use, with only a relatively small portion of such total quantity exposed to contact with a water stream for gradual solution therein, and to provide for automatically bringing successive relatively small portions of the total quantity of treating agent into repeated contact with and partial withdrawal from the water as the portions previously contacted and partially withdrawn are gradually dissolved.

Further objects and advantages of my invention will be pointed out hereinafter or will be apparent from the following description.

In carrying out this invention I provide for rotatably supporting a mass of solid treating agent, preferably in granular, comminuted, or other suitably divided form, with the lower portion thereof immersed in the water stream and the upper portion thereof extending above the surface of the stream in such manner as to permit successive portions thereof to be moved downward by gravity to replace that portion which is removed in solution. I further provide for rotating the mass of treating agent, preferably utilizing the hydraulic power of the stream for that purpose by impingement of the stream upon vanes suitably attached to a container for the mass, and so achieve a continuously shifting water-line upon the mass and a continuously resurgent penetrative effect of the water upon the mass, as the peripheral points of the mass are successively moved from the upstream side of the mass to the downstream side thereof and are returned to the upstream side. I further preferably provide for vertical adjustment of the mass relative to the surface of the stream to control the depth of immersion, as described above.

The mass of treating agent so employed in connection with my invention may, for example be formed of a water-soluble solid fertilizing agent such as sodium, postassium, ammonium or calcium nitrate, ammonium sulphate, ammonium phosphate, or urea, or a mixture of any two or more of such compounds, or any soluble commercial fertilizer containing such compounds. Materials of the class known as soil correcting agents such as gypsum or hydrated lime, may also be used, either alone or mixed with a fertilizing agent or agents.

Other examples of soluble treating agents that may be used as herein described include coagulating agents for use in purification of water, such as aluminum sulphate or iron sulphate, and agents for preventing or controlling growth of animal or vegetable organisms in water, such as copper sulphate.

The mass of treating agent is formed of discrete particles adapted to move downwardly by gravity in replacement of particles removed or dissolved from lower strata of the mass, and further adapted when piled vertically and unconfined horizontally to seek an angle of repose. The particles may be of granular characteristics, preferably ranging in size from about one hundred mesh to eight mesh, or perhaps have the form of molded balls of a diameter preferably less than one-half inch, it being noted in connection with the selection of sizes that while larger particles provide greater inter-particle passages for the infiltration of water, smaller particles provide a greater wetted surface area. The choice of size in any particular instance may be governed by such factors as the velocity of the stream and the desired strength of the solution of treating agent and water; or conversely, the velocity of the stream or the effect of such velocity may be altered as hereinafter described in order to best utilize particles of a particular size. Particles of mixed sizes may be used so long as they will, as a mass, flow by gravity and afford inter-particle passages for the inflow and outflow of water.

In the accompanying drawings, illustrative of preferred and modified forms of apparatus embodying my invention and suitable for carrying out the method thereof:

Figure 1:
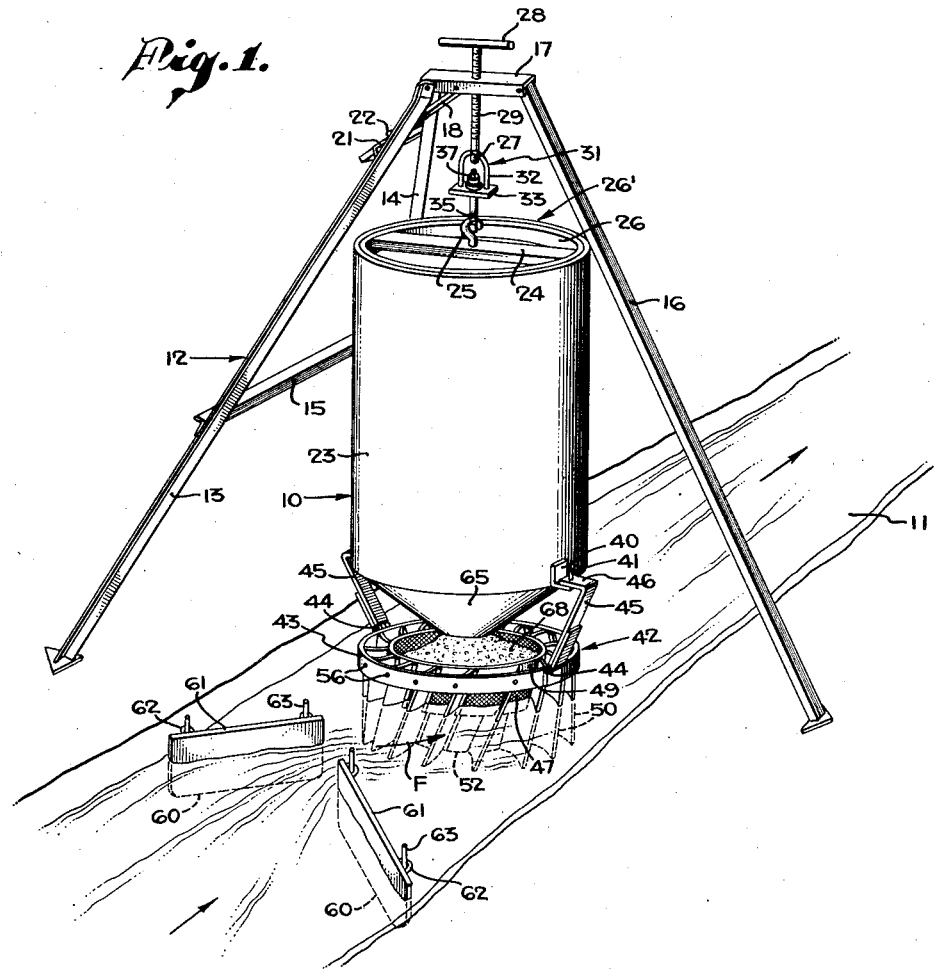
Fig. 1 is a perspective view of a preferred form of apparatus shown suspended over a stream so as to be partly immersed therein.
Figure 3:
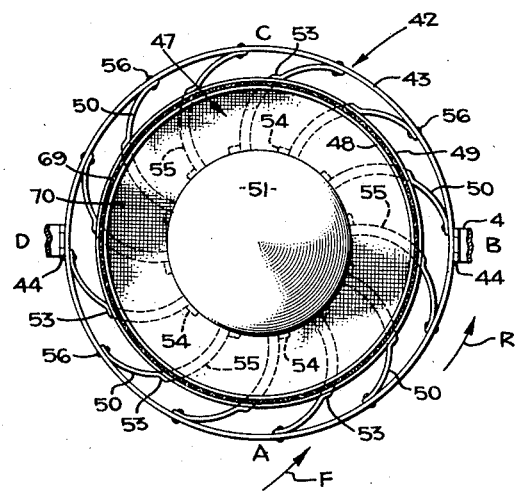
Fig. 3 is a horizontal sectional view on the line 3—3 of Fig. 2.
Figure 2:
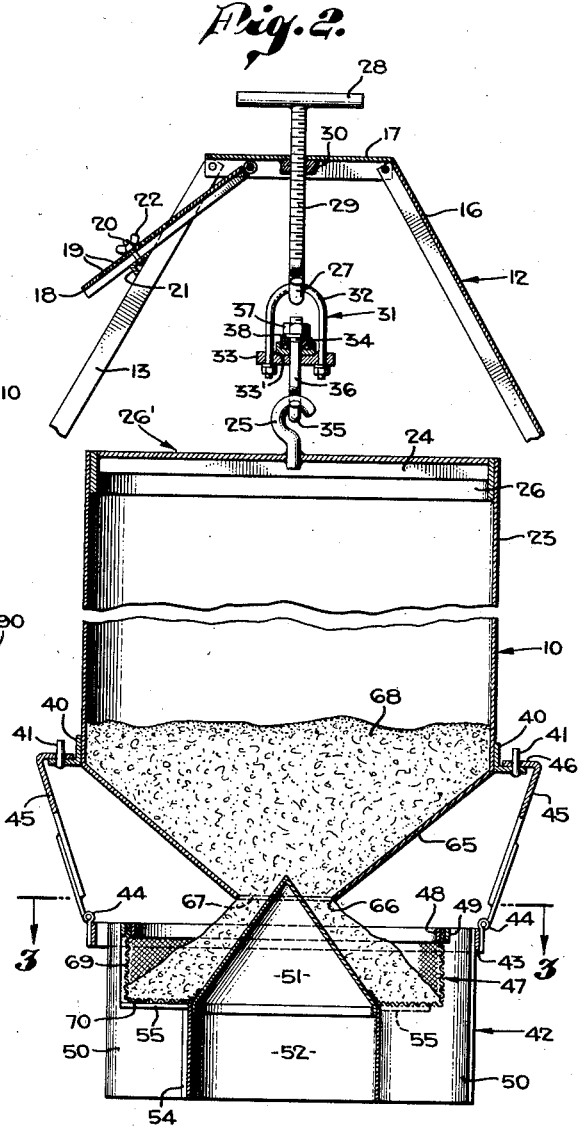
Fig. 2 is a vertical sectional view on an enlarged scale of a portion of the apparatus shown in Fig. 1, other portions not requiring further illustration being omitted.

Having reference to the details of the drawings, and particularly to Figs. 1, 2, and 3, the embodiment of my invention therein illustrated comprises a storage container 10 which may be suspended over a flowing stream of water 11, such as an irrigation ditch, by suitable supporting structure such as a tripod 12. The tripod 12 as shown is arranged to have two of its legs 13 and 14 on one side of the stream and joined by a brace bar 15, and its third leg 16 on the other side of the stream. To obtain lightness combined with strength, I prefer to construct the two legs 13 and 14 and the brace bar 15 of angle iron, and to construct the individual leg 16 of channel iron. The legs 13 and 14 are pivotally connected to the outer sides of a channel iron head-piece 17 and the third leg 16 is pivotally connected to the head-piece 17 between the channel flanges thereof. An adjustment bar 18, swingingly connected to the head-piece 17, has a plurality of holes 19, any of which may be engaged by a stud 20 secured in a second brace bar 21 secured to legs 13 and 14 and provided with a wing nut 22 to hold said legs at a desired angle to the head-piece 17. This permits adjusting the height of the head-piece by which the container 10 is supported, and also adjusting the spacing of legs 13 and 14 from leg 16.

The upper portion 23 of the container 10 is preferably cylindrical and has a cross bar 24 provided with a hook 25 by which the container may be suspended. The cross bar 24 is made of channel iron and is secured at its ends to a reinforcing ring 26 secured to the open upper end 26' of the container. A hook 27, having an operating handle 28 on a screw shank 29 engaging a nut 30 welded to the head-piece 17, is connected to the hook 25 by means of a swivel joint 31 and provides means by which the container 10 may be raised and lowered. The swivel joint 31 comprises a bail 32 engaging the hook 27 and supporting a plate 33 recessed as shown at 33' to receive the lower race of a ball thrust bearing 34, and a hook 35 engaging the hook 25 and having a bolt shank 36 extending loosely through the plate 33 and bearing 34 and provided with a nut 37 and washer 38 engaging the upper race of the bearing. The container 10, and the hereinafter described connected parts, are thus rotatably supported on the swivel joint 31 so as to rotate about a substantially vertical axis. The hook 25 is located centrally of the container 10, so that the axis of rotation coincides with the axis of the container.

The lower end of the cylindric portion 23 of the container 10 is provided with diametrically opposed brackets 40 and studs 41 on which is suspended a bottom member, designated generally by the reference number 42. The bottom member 42 has a ring 43 to which are secured diametrically opposed hinges 44. The hinge straps 45 are bent inward at their ends 46 and pierced to engage the studs 41, so as to detachably suspend the bottom member 42 from the container 10, but rigidly so that the container and bottom member will rotate in unison.

A basket or receptacle 47, of perforated material such as perforated sheet metal or wire screening, has its upper margin clamped between inner and outer rings 48 and 49 and is held concentrically with the container 10 by a plurality of outwardly extending vanes 50. The central part of the bottom of the receptacle 47 is open to receive an upwardly pointed conical member 51 secured thereto at its lower end, from which a cylindrical skirt 52 depends below the receptacle. The vanes 50 are generally L-shaped in vertical elevation with their angulated margins extending inwardly towards and beneath the receptacle 47 and to the skirt 52. The inner margin of the upper portion of each vane has a tab 53 by which it is secured, as by spot-welding, to the ring 49 and the inner margin of the lower portion of each vane has a tab 54 secured in like manner to the skirt 52. The upper margin of the lower portion of each vane may be bent to form a horizontal flange, as shown at 55 in Fig. 3, to afford a broader supporting surface in contact with the receptacle 47. The upper outer corner of each vane is secured, as by rivets 56, to the ring 43. By this construction, hydro-kinetic force applied to the vanes 50 is transmitted through the hinge straps 45 to the container 10 and the swivel joint 31. The bottom member 42 and receptacle 47 are arranged coaxially with respect to container 10.

The vanes 50 are curved in concavo-convex horizontal cross-section, and therefore when subjected to the hydro-kinetic force of a stream, they respond to such force in the same manner as the cups of an anemometer respond to the force of the wind, developing a torque about their central axis in the direction of their convexity, and thereby causing the bottom member 42 and container 10 to rotate in unison upon the swivel joint 31. Preferably, for reasons hereinafter stated, the vanes 50 are also inclined so that their concave surfaces are faced slightly upwardly, which is to say, the inclination of the vanes upwardly is in the direction of convexity thereof and consequently in the direction of torque.

Not only to increase the torque developed by the vanes 50 but also to cause a significant variation of the water level on the periphery of the receptacle 47, jetties 60 are preferably placed in the stream 11, at the upstream side of the receptacle 47. There jetties serve to confine the water stream and so increase the velocity of impingement thereof against the vanes 50 and to direct the main flow of the stream against said vanes. Furthermore, said jetties are preferably arranged to direct the stream substantially tangentially to that quadrant of the bottom member 42 which is upstream and rotating in a downstream direction. This quadrant is the quadrant A—B in Fig. 3, and the preferred direction of water flow as directed by jetties 60 is approximately as indicated by the arrows at F in Figs. 1 and 3. The jetties 60 may be planks 61, provided with eyebolts 62 to be slipped over stakes 63 driven into the stream bed, and the preferable manner of placing the stakes to secure the most advantageous impingement of the stream upon the bottom member 42 will be apparent to one skilled in irrigating, the eddies and currents of the particular stream being taken into account.

The lower portion of the container 10, below the cylindrical portion 23, is formed as an inverted cone 65 and has a centrally located opening 66 at its apex into which the apex of the conical member 51 extends so as to leave an annular space 67. The opening 66 is smaller than the interior of the perforated receptacle 47 so that materials 68 flowing by gravity from the container 10 through the opening 66 are spread by the conical member 51 towards the periphery of the receptacle 47 while at the same time their rate of flow is restricted by the annular space 67 to a rate of replacement of materials removed from the receptacle 47. It should be noted that both the side wall 69 and the bottom wall 70 of the receptacle 47 are perforated and that, as will be seen, material is removed from the receptacle through both the side wall and bottom wall. It is not to be understood that materials are directed by the conical member 51 solely towards the side walls 69, but rather that they are spread to all parts of the annular zone of the receptacle 47 surrounding the conical member 51, as they may be needed to replace material dissolved therefrom. The material passing through throat 67 will build up to its angle of repose in receptacle 47, and the margin of opening 66 is so located with respect to side wall 69 as to prevent the level of material as determined by the angle of repose from reaching the top of said side wall.

The inwardly bent end portions 46 of straps 45 have a substantial bearing surface in engagement with the outwardly extending flanges of brackets 40, and are held in bearing engagement therewith by the weight of the bottom member 42 and the material contained therein, so as to prevent any appreciable tilting of said bottom member relative to the container 10 and cause said bottom member and said container to rotate together about their common axis. If desired, bottom member 42 may be raised relative to the container 10 so as to decrease the radial width of throat 67, by placing spacing washers or the like of any desired thickness over the studs 41, between strap portion 46 and brackets 40.

To supply soluble treating agents to the stream 11, the operator sets up the apparatus as above-described, including if desired the jetties 60, places the soluble materials in the container 10 and adjusts the height of the receptacle 47 relative to the stream level by means of the handle 28. As the vanes 50 extend below the receptacle 47 and have there the major portion of their surface area, it is not necessary to immerse the receptacle 47 deeply in order to develop torque on the bottom member 42. As illustrated in Fig. 1, the torque developed by impingement of the stream 11 upon the vanes 50 is in a counter-clockwise direction as indicated by the arrow at R in Fig. 3, and the right side of the bottom member 42 and container 10 will rotate in a downstream direction. Water entering between the blades 50 at the upstream side of the receptacle 47 will surge upwardly against the receptacle, entering the perforations thereof and dissolving some portion of the material 68. The upward surge is slightly accentuated by the inclination of the vanes 50 upwardly in the direction of rotation. As any particular compartment defined by two adjacent vanes arrives at the down-stream side of the receptacle 47, the water level in the compartment will fall and the solution will flow out of the adjacent portion of the receptacle, the point of change depending upon the currents and eddies set up by the jetties 60 and the banks of the stream and the position of the apparatus in the stream. Generally speaking, a wave-line will be established which, counting in the direction of rotation from the point where the vanes 50 cease to be resistant to rotation and become propellant, such as the point A in Fig. 3, will surge upwardly in the first quadrant such as A—B, drop gradually in the second and third quadrants such as B—C and C—D, and hold about level in the fourth quadrant such as D—A. The water enters the receptacle 47 both through the side wall 69 and the bottom wall 70 in the zone of rotation having a rising wave-line, and the resultant solution leaves the receptacle through both the side wall and the bottom wall in the zone of rotation having a falling wave line. With coarse granular material some of the water or solution may traverse the receptacle 47 from one inter-vane compartment to another, but with fine granular or pulverulent material of, say, 10 to 30 mesh or finer, nearly all of the solution will re-enter the stream through perforations adjacent to those through which the water entered the receptacle.

The constant surging in and out of the water and the resultant solution causes the treating agent to dissolve at a rate much faster than would be caused by a steady stream having the same velocity as the stream 11. The constant change of water level at any particular point within the receptacle 47 also interrupts capillary action in the granular material and prevents water from seeping upwardly therein. Consequently surface wetting of the granular particles does not occur except where active surging and washing action also occurs, and caking of the material is avoided. The gravitational flow of treating agent as replacement for the dissolved agent is further assisted by the substantially uniform rate at which the particles dissolve in all sectors of the receptacle 47, affording no opportunity for caking in any particular sector.

Furthermore, it will be observed that the wetting of the material either by direct contact with the inflow of water or by capillary action can occur only within the receptacle 47, the material in container 10 and at the throat 67 being above the region of such wetting. Consequently, any caking or agglomerating action that may tend to occur will only affect the material within receptacle 47, which material is substantially unrestrained from free downward movement by gravity and has an unconfined outer surface as defined by the angle of repose, so that any cakes or agglomerates that may tend to form will not retard the continued downward movement and solution of such material.

The rate at which the treating agent passes into solution will depend upon the velocity of rotation of the apparatus, the surge of the waveline, and the depth to which the receptacle 47 is immersed. The first named factor may be regulated in any particular stream by adjustment of the jetties 60, and also by adjustment of the immersion of the vanes 50 by means of the screw shank 29 and handle 28, to give greater or lesser propelling surface. The second named factor depends partly on the first factor, but may also be regulated by the jetties by directing part of the stream to the stream-ascending side of the bottom member 42. The third factor, of course, is regulated by the screw shank 29 and, if desired, by adjusting the legs 13, 14 and 16 to vary the height of head-piece 17. Not all of the solution formed in the receptacle 47 leaves the receptacle at each revolution, some remaining therein to be re-diluted with fresh water, and it will be found that a change in the concentration of the solution may be effected by varying the speed of rotation of the apparatus, greater speed giving a weaker solution but a greater quantity thereof. The quantity of solution will vary substantially directly with the depth of immersion and the wave height.

Figure 4:
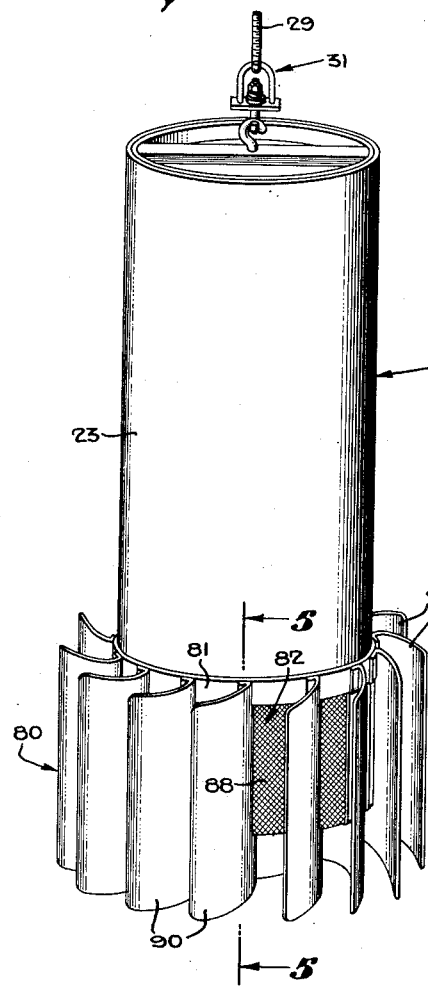
Fig. 4 is a perspective view of a modified form of apparatus according to my invention.
Figure 5:
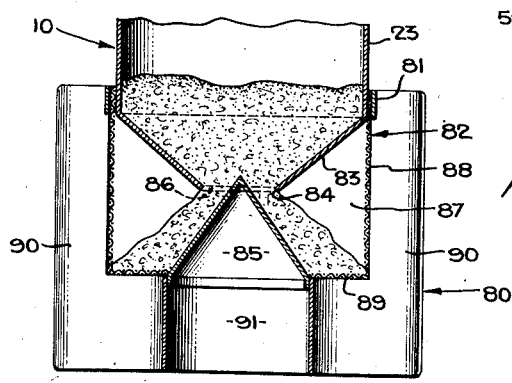
Fig. 5 is a vertical sectional view on the line 5—5 of Fig. 4.

In Figs. 4 and 5, I have illustrated a modified form of apparatus according to my invention in which a bottom member 80 is formed integrally with the container 10. The method of suspension is the same as in the preferred embodiment of my invention including a swivel joint 31 and screw shank 29 by which the container and bottom member are rotatably suspended and vertically adjustable. A ring 81 holds the upper margin of a perforated receptacle 82 clamped against the lower margin of the cylindrical portion 23 of the container 10. A conical lower portion 83 of the container 10 extends downwardly into the receptacle 82 and terminates in an opening 84. The receptacle 82 supports centrally a cone 85 which extends upwardly into the opening 84, leaving an annular space 86. It will be seen that in this construction the annular space 86 feeds granular materials by gravity from the container 10 into a totally enclosed space 87 having relatively high perforated side walls 88 and a perforated bottom wall 89. The upward continuation of the side walls 88 to join the cylindrical portion 23 reduces the opportunity for splashing water to reach the material passing through the annular passage 86 and wetting it to the point of caking. A plurality of vanes 90, having concavo-convex horizontal cross-section but installed vertically, are secured by welding to the ring 81 and to a skirt 91 depending from the cone 85.

Jetties 60 may be used as a part of this modified form of my invention and the method of operation of this form is substantially the same as hitherto described, with the exception that the vertical vanes 90 do not accentuate the wave-height to the same extent as do the inclined vanes 50.

It will be appreciated that in some cases, particularly with a relatively small total weight of material in the container, the entire rotating assembly in either of the above-described forms of apparatus may be tilted a few degrees from the vertical by the force of the impinging water stream so that the axis of rotation is not actually vertical, but may still be described as substantially vertical. Any such minor departure from the vertical does not interfere with the rotation of the container and the perforated receptacle nor with the feeding of the material from the storage container into the dissolving receptacle, and does not appear to materially affect the rate of solution.

Having described a preferred embodiment of my invention, it will be understood that various changes therein may be made by those skilled in the art without departing from the spirit and scope of my invention; and I therefore wish it understood that the foregoing description and attached drawings are to be construed as illustrative of, rather than restrictive upon, the appended claims.

I claim:

1. An apparatus for supplying a soluble treating agent to flowing water comprising, in combination: a vertically extending mass of water soluble treating agent composed of discrete particles adapted to move downward by gravity; means for rotatably supporting said mass in upright position so that said mass is partly immersed in the water of a flowing water stream to permit solution of said treating agent from the immersed portion of said mass and with the upper portion of said mass extending above the upper surface of said stream; said supporting means including a perforated bottom member in supporting engagement with the lower end of said mass and also including means for distributing successive portions of said mass toward the periphery of said bottom member to replace the treating agent removed from said mass by solution; and means for rotating said mass about a substantially vertical axis thereof.

2. An apparatus as set forth in claim 1, further including means for vertically adjusting the elevation of said mass with respect to said stream so as to vary the depth to which said mass is immersed.

3. An apparatus as set forth in claim 1, in which said means for rotating said mass include a plurality of vanes of concavo-convex horizontal cross section secured to said bottom member so as to be partly immersed in said stream and to extend outwardly from said bottom member in substantially symmetrical arrangement.

4. An apparatus as set forth in claim 3 in which said vanes are inclined so that their concave sides face upwardly.

5. An apparatus as set forth in claim 3, further including jetty means on the upstream side of said bottom member arranged to deflect said stream so as to cause a higher water level on that side of said mass rotating in a downstream direction than on the opposite side of said mass.

6. An apparatus for supplying a soluble treating agent to flowing water comprising: a storage container for containing a mass of water soluble treating agent composed of discrete particles adapted to flow by gravity, said container having a bottom opening for discharge therefrom of said particles; means for supporting said container in upright position above a water stream for rotation about a substantially vertical axis; body means connected to the lower portion of said container inclusive of a perforated receptacle disposed to receive said particles discharged from said container through said bottom opening and normally to be partly immersed in said stream so as to permit solution of said particles in said stream; and water wheel means actuable by said stream for rotating said receptacle and said container about said axis; said bottom opening in the container being smaller than the interior of said perforated receptacle and being located centrally with respect thereto so as to restrict the discharge of said particles from said container into said receptacle and to cause the particles so discharged to be distributed outwardly toward the periphery of said receptacle.

7. An apparatus as set forth in claim 6, said perforated receptacle being provided with a centrally located conical member whose apex extends upwardly within the bottom opening of the storage container.

8. An apparatus for supplying a soluble treating agent to flowing water comprising: body means inclusive of a perforated receptacle; means for rotatably supporting said body means with reference to a stream of water so that said receptacle is partly immersed in said stream; a storage container for containing a mass of water soluble treating agent composed of discrete particles adapted to flow by gravity, and having an outlet disposed to discharge said particles to said receptacle for solution in said stream; means for distributing the flow of discharged particles toward the periphery of said receptacle; and water wheel means secured to said body means for causing rotation thereof.

9. An apparatus as set forth in claim 8 in which said water wheel means comprise vanes secured to said body means in outwardly extending relation to the axis of rotation thereof and in substantially symmetrical arrangement and having concavo-convex cross-sections.

10. An apparatus as set forth in claim 9 in which the plane axes of said vanes are inclined to the axis of rotation of said body means and the inner margins of said vanes are substantially contiguous to said receptacle.

11. An apparatus as set forth in claim 8, in which said distributing means extend in juxtaposition to said outlet so as to limit the rate of discharge of said particles therethrough to the rate at which said particles are dissolved in said stream.

12. An apparatus for supplying a soluble treating agent to flowing water comprising: a storage container for containing a mass of water soluble treating agent composed of discrete particles adapted to flow by gravity, said container having a bottom opening for discharge therefrom of said particles; means for supporting said container in upright position above a water stream for rotation about a substantially vertical axis; body means connected to the lower portion of said container inclusive of a perforated receptacle disposed to receive said particles from said container and normally to be partly immersed in said stream so as to permit solution of said particles in said stream; water wheel means actuable by said stream for rotating said receptacle and said container about said axis; and means for vertically adjusting the elevation of said receptacle with respect to said stream so as to vary the depth to which said receptacle is immersed.

13. An apparatus for supplying a soluble treating agent to flowing water comprising: a storage container for containing a mass of water soluble treating agent composed of discrete particles adapted to flow by gravity, said container having a bottom opening for discharge therefrom of said particles; means for supporting said container in upright position above a water stream for rotation about a substantially vertical axis; body means connected to the lower portion of said container inclusive of a perforated receptacle disposed to receive said particles from said container and normally to be partly immersed in said stream so as to permit solution of said particles in said stream; and water wheel means actuable by said stream for rotating said receptacle and said container about said axis; said body means being detachably secured to said container and including means normally in juxtaposition with said bottom opening for limiting the rate of distribution of said particles therethrough to the rate at which said particles are dissolved in said stream and for distributing said discharged particles towards the periphery of said perforated receptacle.

14. An apparatus for supplying a soluble treating agent to flowing water comprising: a storage container for containing a mass of water soluble treating agent composed of discrete particles adapted to flow by gravity, said container having a bottom opening for discharge therefrom of said particles; means for supporting said container in upright position above a water stream for rotation about a substantially vertical axis; body means connected to the lower portion of said container inclusive of a perforated receptacle disposed to receive said particles from said container and normally to be partly immersed in said stream so as to permit solution of said particles in said stream; and water wheel means actuable by said stream for rotating said receptacle and said container about said axis; said water wheel means comprising vanes secured to said body means in outwardly extending relation to said axis and having inner margins substantially contiguous to the periphery of said receptacle, said vanes being of concavo-convex horizontal cross section and extending outwardly from said receptacle in substantially symmetrical arrangement, said vanes extending upwardly above the water level normal to said receptacle and being inclined so that their concave sides face upwardly.

EUGENE L. PRIZER.

REFERENCES CITED

The following references are of record in the file of this patent:

UNITED STATES PATENTS

| Number | Name | Date |
|---|---|---|
| 1,910,235 | Burkett | May 23, 1933 |